United States Patent [19]

Love

[11] 4,111,408

[45] Sep. 5, 1978

[54] KNOCK-DOWN WORKPIECE-SUPPORTING STANDARD AND OVERSPRAY SHIELD

[76] Inventor: Francis Lee Love, 7010 Reynoldsburg-New Albany Rd., New Albany, Ohio 43054

[21] Appl. No.: 828,040

[22] Filed: Aug. 26, 1977

[51] Int. Cl.² .................................................. B25J 3/00

[52] U.S. Cl. ............................ 269/289 R; 214/15 W; 248/354 R

[58] Field of Search ............... 248/351, 354 P, 354 R; 214/15, 15 W; 254/133 A; 269/3, 289 R

[56] References Cited

U.S. PATENT DOCUMENTS

| | | | |
|---|---|---|---|
| 2,358,865 | 9/1944 | McPherson | 248/354 P |
| 2,655,412 | 10/1953 | Jones | 214/15 W |

FOREIGN PATENT DOCUMENTS

| | | | |
|---|---|---|---|
| 962,548 | 12/1949 | France | 248/354 P |

*Primary Examiner*—Robert C. Watson
*Attorney, Agent, or Firm*—William S. Rambo

[57] ABSTRACT

A knock-down, collapsible, umbrella-type standard is used in spray painting doors, panels, boards or similar workpieces, and features a sectional post arranged for mounting between the floor and ceiling of a room to provide a prop against which the workpiece may be leaned and supported during spray painting thereof, and an outwardly radiating, skeletal frame detachably carried at the upper end of the post for clamping a relatively large area, protective sheet of paper or the like against the ceiling of the room to protect it against overspray arising during spray painting operations.

1 Claim, 5 Drawing Figures

KNOCK-DOWN WORKPIECE-SUPPORTING STANDARD AND OVERSPRAY SHIELD

BACKGROUND OF THE INVENTION

This invention relates generally to painter's tools and accessories, and more particularly to a knock-down, umbrella-type standard which may be erected between the floor and ceiling of a room to provide a prop-type support for an unfinished workpiece during spray painting thereof, and which provides a protective overspray shield for the ceiling of the room.

Heretofore, it has been extremely difficult and tedious to spray paint or spray varnish doors, large panels and similar undetached workpieces within a finished or partially finished room of a house or building, without overspraying onto ceilings or walls of the room. Equal difficulty has been encountered in supporting relatively large size workpieces, such as doors or wall panels in a manner to provide ready access to all surfaces of the workpiece to be spray painted without repositioning the workpiece and running the risk of marring a previously painted surface thereof. As a consequence, it is often necessary to remove a door panel or other large size workpiece from the interior of a house or building, or place the workpiece within a specially erected spray painting booth or tent. All of this adds greatly to the labor costs of spray painting, and the overall time required to carry out an otherwise simple operation.

SUMMARY AND OBJECTS OF THE INVENTION

The present invention provides a readily collapsible, umbrella-type supporting standard which may be easily and conveniently assembled and erected in a central, open area of a room between the floor and ceiling of the room so as to provide a minimal area prop against which an unfinished door, or large size panel may be leaned and supported for spray painting of all areas thereof. The upper end portion of the standard is equipped with an outwardly radiating, umbrella-type skeletal frame which functions to support a large area protective sheet or film in contact with the surface of the ceiling above the spray painting area, so as to protect the ceiling against overspray. The supporting post or standard is formed at longitudinally spaced intervals therealong with peg-receiving openings or apertures into which may be placed and held one or more standoff pins or pegs which provide a minimal point or points of contact with the supported workpiece, and which function to space the supported workpiece slightly outwardly away from the post or standard and thereby to prevent masking or obstructing any substantial area of the workpiece to be spray painted.

The principle object of this invention is to provide a comparatively inexpensive, quickly erected tool or appliance which enables the spray painting of doors, large panels and the like within a finished or partially finished room of a building, without necessitating extensive masking of the adjacent walls, ceilings or floors of the building, and without the use of relatively expensive and cumbersome spray painting booths, tents or the like.

Further objects and advantages of the present invention will become more readily apparent by reference to the following description and the accompanying drawings.

DESCRIPTION OF PREFERRED EMBODIMENT OF THE INVENTION

Figure 1:
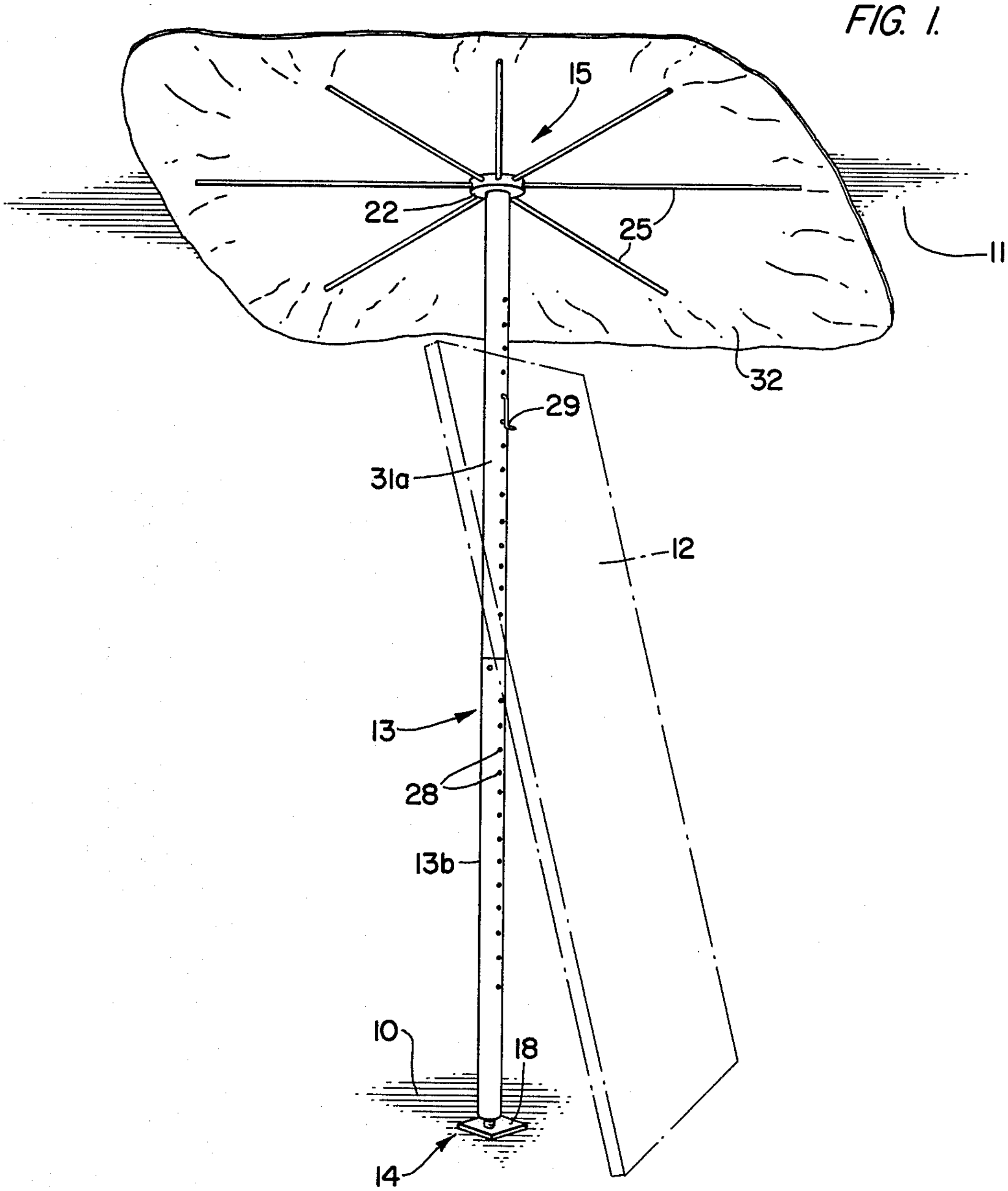
FIG. 1 is a pictorical, perspective view illustrating the present workpiece-supporting standard and overspray shield erected between the floor and ceiling of a room, and supporting a door panel in readiness for spray painting.
Figure 2:
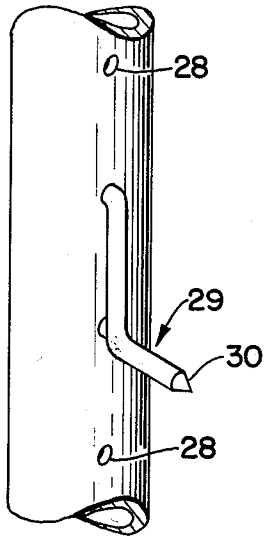
FIG. 2 is an enlarged, fragmentary perspective view of a segment of the tubular post or standard showing particularly a laterally outwardly projecting standoff pin or peg positioned in a set of openings or holes formed in the post.

Referring now to the drawings, FIG. 1 illustrates the present workpiece-supporting standard and overspray shield in its entirety, operatively positioned between the floor 10 and ceiling 11 of a room, and supporting a rectangular door or panel 12 in a slightly vertically inclined, leaning position. The workpiece-supporting standard comprises an elongated, sectional, tubular post indicated generally by reference numeral 13, a longitudinally adjustable floor-engaging foot 14 carried at the lower end of the post 13, and a skeletal ceiling-engaging frame 15 carried at the upper end of the post 13.

Figure 4:
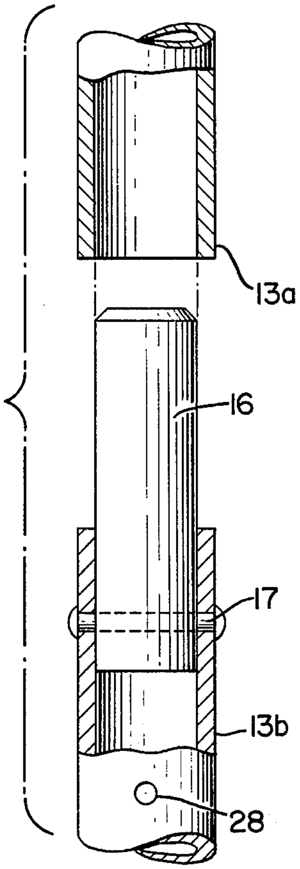
FIG. 4 is an exploded vertical sectional view taken through the relatively connecting end portions of the detachable tube sections of the post or standard.
Figure 5:
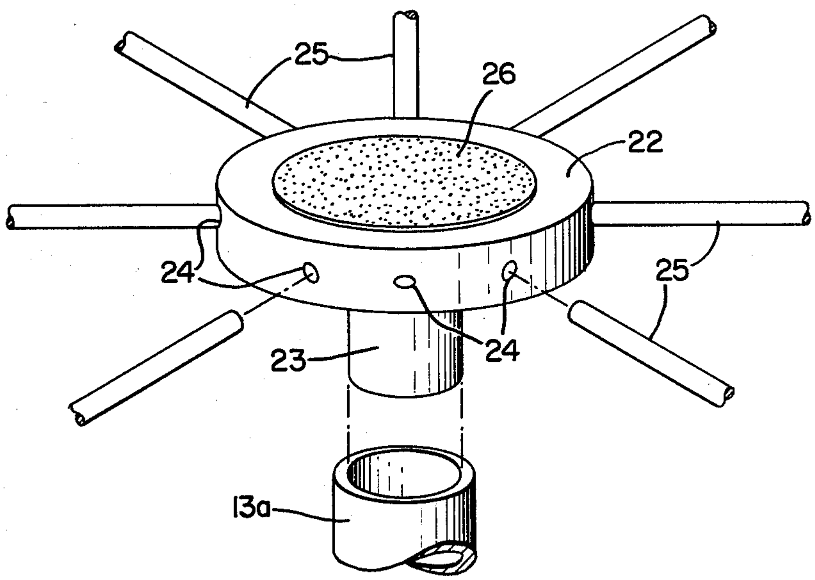
FIG. 5 is a fragmentary perspective view of the ceiling-engaging skeletal frame which is carried at the upper end of the post or standard.

The post 13 includes a pair of relative separable upper and lower tubular sections **13*a* and 13*b*, respectively, which may be detachably connected in longitudinally adjoining, axially aligned, relation by an intermediate dowel 16 arranged to telescope within the adjoining end portions of the upper and lower post sections 13*a* and 13*b*. The dowel 16 is preferably secured to the lower post section 13*b* by means of a rivet 17 which extends transversely or diametrically through the walls of the lower post section 13*b* and through an opening formed in the lower end portion of the dowel 16, as shown in FIG. 4. The upper end portion of the dowel 16 projects outwardly from the lower post section 13*b* and telescopes within the lower end of the upper post section 13*a*** when the two post sections are connected.

Figure 3:
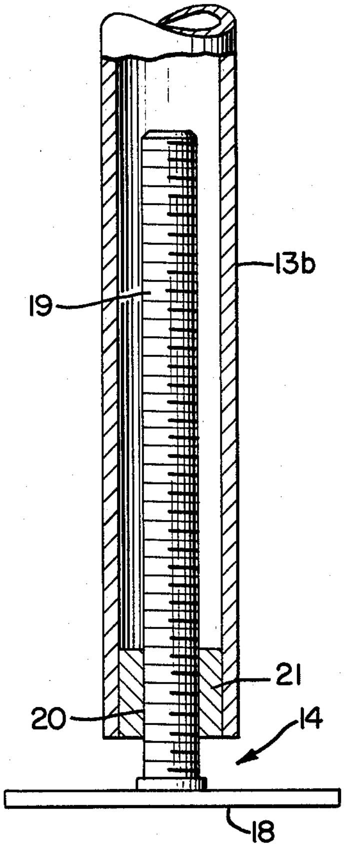
FIG. 3 is an enlarged, detailed vertical sectional view of the lower, floor-engaging foot of the standard.

As detailed in FIG. 3, the floor-engaging foot 14 of the standard comprises a relatively flat base plate 18 which is secured to the lower end of an eternally screw-threaded shaft or rod 19. The rod 19 is carried in a cooperatively threaded bore 20 formed centrally within a plug or bushing 21 which is press-fitted, or otherwise secured, within the lower end of the lower post section **13*b*. The screw-threaded connection between the rod 19 and the bushing 21 permits the floor-engaging foot 14 to be adjusted inwardly and outwardly with respect to the lower end post 13**.

The upper, ceiling-engaging skeletal frame 15 resembles somewhat an umbrella frame, and comprises a central, generally circular or cylindrical hub portion 22 which is formed with an axially depending stem 23 for frictional telescoping engagement within the upper end of the upper post section **13*a*. The cylindrical hub portion 22 is formed at circumferentially spaced intervals with a series of radially disposed bores or sockets 24** which are arranged to frictionally receive the inner end portions of a like number of outwardly radiating, elongated rods or fingers 25. The cylindrical hub portion 22 is preferably provided on its central upper end surface with an adhesive patch 26.

The upper and lower sections 13*a* and 13*b* of the post 13 are formed at longitudinally spaced intervals therealong with peg-receiving holes or apertures 28 which may be selectively positioned one or more standoff pegs or pins 29 which are formed with a pointed, workpiece-engaging end extremity 30. The standoff pin 29 is somewhat similar in construction to a conventional peg board bracket, in that it may be readily removed from one set of openings 28, by swinging the pin upwardly, and repositioned in another set of the openings 28 of the post.

As will be apparent, the present workpiece-supporting standard and overspray shield is constructed so that it may be stored and transported in a knocked-down or disassembled condition in which the upper and lower sections 13*a* and 13*b* are detached from one another and the rods or fingers 25 are removed from the sockets 24 of the hub member 22. However, in operation, the rods or fingers 25 of the skeletal frame 15 are first frictionally fitted in the sockets 24 of the hub member 22, and the stem 23 of the hub member 22 is frictionally fitted in the upper end of the upper post section 13*a*. A comparatively large area paper sheet 32 or piece of plastic film is adhesively secured by the adhesive patch 26 in overlying relation to the outwardly radiating arms or fingers 25 of the skeletal frame. This may be easily accomplished by placing the film or sheet 32 in flat, spread-out condition on the floor of the room and then inverting and placing the hub portion 22 and its adhesive patch 26 on the central portion of the film or sheet 32. The upper post section is attached to the stem 24 of the hub 22. Then by swinging the upper post section 13*a* in an upward arc, the sheet 32 may be picked off of the floor and placed in contact with the desired area of the ceiling 11. The connecting dowel 16 carried by the lower post section 13*b* may then be inserted in the lower end of the upper section 13*a* to connect the post sections in longitudinally aligned order, at which time the floor-engaging foot 14 is extended outwardly and downwardly by manual rotation of the plate 18, until the plate 18 becomes tightly engaged with the floor surface 10. In this position, the central portion of the film or sheet 32 is clamped against the ceiling surface 11, and the outwardly radiating arms or fingers 25 support the sheet or film in canopy-like fashion above the work area.

Next, the standoff pin or peg 29 is engaged with a selected set of openings 28, so as to position the outer pointed extremity 30 thereof at the desired height along the post 13 to support a particular workpiece. In the case of a relatively large door panel such as illustrated by broken lines at 12, the standoff pin or peg 29 would normally be positioned well upwardly along the post 13, so that the center line of the door panel 12 may be aligned with and tilted into engagement with the pointed extremity 30 of the pin 29 and thus supported in slightly vertically inclined, but outwardly spaced relation to the post 13. Thus positioned, the door panel 12 is in readiness for spray painting, and all surfaces of the door panel may be sprayed without changing its position. During the spray painting of the door panel, any vertically arising overspray from the spray gun will be deposited upon the under surface of the disposable film or sheet 32, rather than upon the surface of the ceiling 11. The door panel or other workpiece may be permitted to remain in situ against the pointed end of the standoff pin 29, until the paint or varnish thereon is sufficiently dry to permit manual handling and removal of the workpiece.

The present workpiece-supporting standard and overspray shield may be readily disassembled from its operative position by first screwing the floor-engaging foot 14 inwardly of the lower post section 13*b*, and then detaching the lower post section 13*b* from the upper post section 13*a*, and then manually lowering the skeletal frame 15 and sheet 32. Thereafter the sheet 32 may be removed from the adhesive patch 26 and discarded. The rods or fingers 25 may then be removed from the sockets 24 of the hub section 22.

It will thus be seen that the present invention provides a mechanically simple, yet highly efficient workpiece-supporting standard and overspray shield for spray painting operations. The standard and overspray sheild is characterized by its ease of assembly and disassembly and its ability to support relatively large area workkpieces in a position where all surfaces thereof may be spray painted without adjusting the position of the workpiece, and without getting overspray on adjacent surfaces of the ceiling.

While a single preferred embodiment of the present invention has been illustrated and described in detail, it will be understood that various embodiments in details of construction and design are possible without departing from the spirit of the invention or the scope of the following claims.

I claim:

1. A knock-down workpiece-supporting standard and overspray shield for paint-spraying operations, comprising:

(a) an elongated, generally vertically arranged post including a plurality of readily separable, longitudinally adjoining tubular sections formed at longitudinally spaced intervals with sets of peg-receiving openings;

(b) a workpiece-engaging standoff peg selectively positioned in a set of the peg-receiving openings of said post and operable to support a workpiece in relatively outwardly spaced relation to said post;

(c) a longitudinally extensible, floor-engaging foot adjustably carried at the lower end of said post; and (d) a generally horizontally disposed, ceiling-engaging frame detachably carried at the upper end of said post and including a central, generally circular hub formed with a plurality of circumferentially spaced apart, radially disposed sockets and a plurality of elongated rods frictionally and detachably carried in the sockets of said hub and extending radially outwardly therefrom, the hub and rods of said frame being operable to support a flexible, overspray-collecting sheet in protective, overlying relation to the ceiling of a room in which said post and workpiece are positioned.

* * * * *